United States Patent
Kim et al.

(10) Patent No.: US 9,237,528 B2
(45) Date of Patent: Jan. 12, 2016

(54) METHOD FOR TRANSMITTING POWER HEADROOM REPORT, AND APPARATUS FOR SAME

(71) Applicant: LG ELECTRONICS INC., Seoul (KR)

(72) Inventors: Dongcheol Kim, Anyang-si (KR); Hangyu Cho, Anyang-si (KR); Wookbong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 14/343,366

(22) PCT Filed: Oct. 4, 2012

(86) PCT No.: PCT/KR2012/008035
§ 371 (c)(1),
(2) Date: Mar. 6, 2014

(87) PCT Pub. No.: WO2013/051855
PCT Pub. Date: Apr. 11, 2013

(65) Prior Publication Data
US 2014/0219234 A1   Aug. 7, 2014

Related U.S. Application Data

(60) Provisional application No. 61/542,826, filed on Oct. 4, 2011, provisional application No. 61/566,012, filed on Dec. 2, 2011.

(51) Int. Cl.
*H04W 4/00* (2009.01)
*H04W 52/18* (2009.01)
*H04W 52/36* (2009.01)
*H04B 7/02* (2006.01)
(Continued)

(52) U.S. Cl.
CPC ............... *H04W 52/18* (2013.01); *H04B 7/024* (2013.01); *H04W 52/365* (2013.01); *H04L 5/0091* (2013.01); *H04W 24/10* (2013.01); *H04W 52/146* (2013.01)

(58) Field of Classification Search
None
See application file for complete search history.

(56) References Cited

U.S. PATENT DOCUMENTS

2011/0098054 A1* 4/2011 Gorokhov et al. ......... 455/452.1
2011/0159914 A1* 6/2011 Chen et al. ................... 455/522
(Continued)

FOREIGN PATENT DOCUMENTS

JP   2011-29743 A   2/2011
JP   2011029743 A   2/2011
(Continued)

OTHER PUBLICATIONS

MediaTek, "Per UE PHR for carrier aggregation", 3GPP TSG-RAN WG1 Meeting #61bis, R1-103743, Jun. 28-Jul. 2, 2010.

*Primary Examiner* — Anh-Vu Ly
(74) *Attorney, Agent, or Firm* — Dentons US LLP

(57) ABSTRACT

Disclosed are a method for transmitting a power headroom report (PHR) and a terminal apparatus for same. The method for transmitting a PHR from a terminal in a network, which includes a base station and at least one cooperative node performing cooperative communication with the base station, includes a step of determining a sounding reference symbol (SRS) transmission power for transmitting SRSs in a specific serving cell, wherein the determined SRS transmission power is a value determined for the transmission of the SRSs to a plurality of nodes including a first node corresponding to the base station and the at least one cooperative node.

14 Claims, 8 Drawing Sheets

(51) Int. Cl.
*H04W 24/10* (2009.01)
*H04L 5/00* (2006.01)
*H04W 52/14* (2009.01)

(56) References Cited

U.S. PATENT DOCUMENTS

2011/0294529 A1* 12/2011 Luo et al. .................. 455/509
2012/0252474 A1* 10/2012 Tiirola et al. ................ 455/450
2013/0176953 A1* 7/2013 Stern-Berkowitz et al. .. 370/329

FOREIGN PATENT DOCUMENTS

| KR | 10-2011-0016907 A | 2/2011 |
| KR | 20110016907 A | 2/2011 |
| KR | 10-2011-0039172 A | 4/2011 |
| KR | 20110039172 A | 4/2011 |

* cited by examiner

FIG. 5
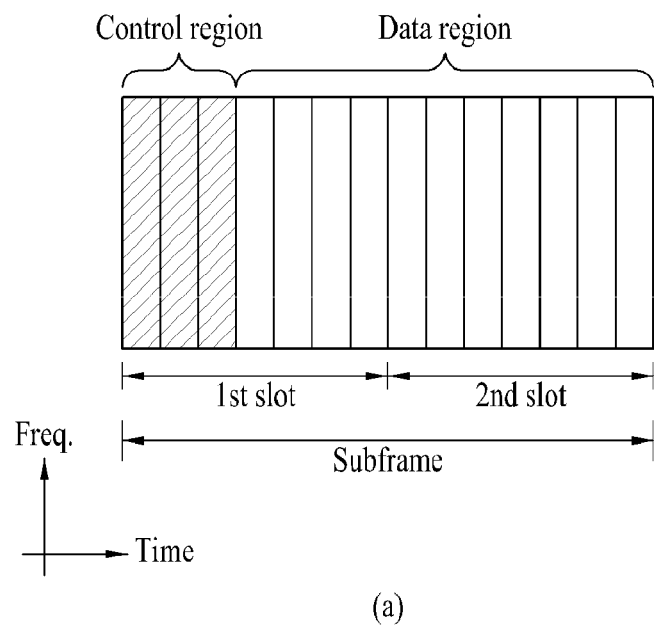
(a)
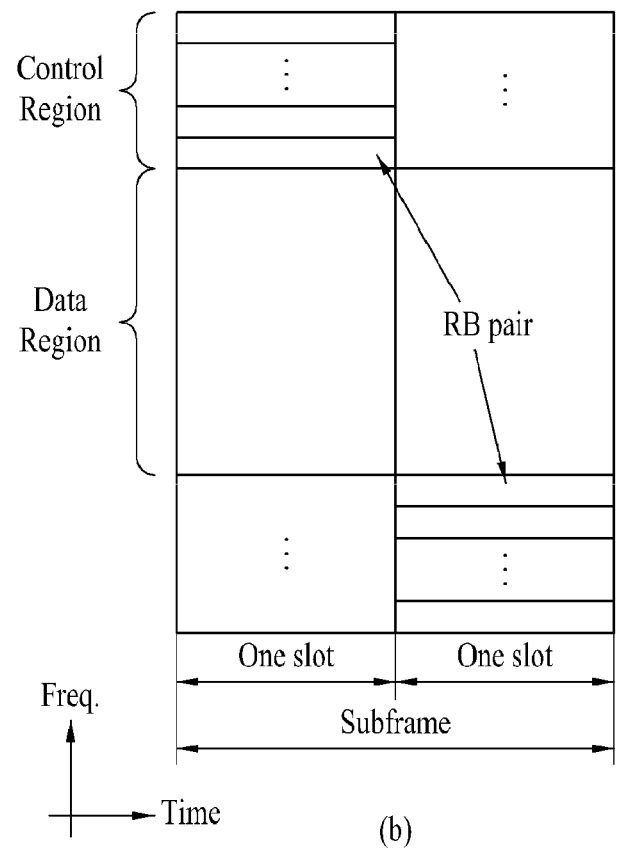
(b)

FIG. 7
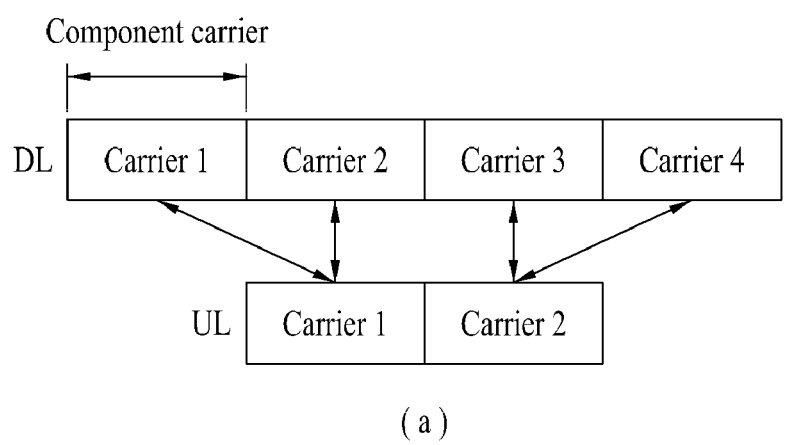
(a)
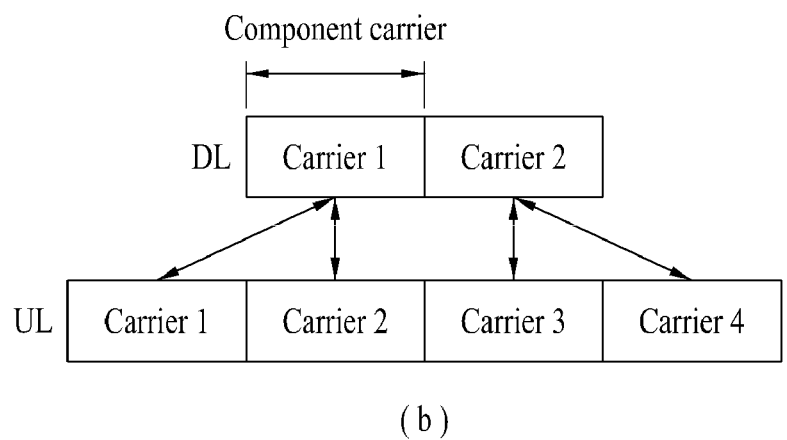
(b)

METHOD FOR TRANSMITTING POWER HEADROOM REPORT, AND APPARATUS FOR SAME

This application is a 35 USC §371 National Stage entry of International Application No. PCT/KR2012/008035, filed Oct. 4, 2012, and claims priority to U.S. Provisional Application Nos. 61/542,826, filed Oct. 4, 2011 and 61/566,012, filed Dec. 2, 2011, all of which are hereby incorporated by reference in its entirety.

TECHNICAL FIELD

The present invention relates to wireless communication and, more particularly, to a method for transmitting a power headroom report and an apparatus for the same.

BACKGROUND ART

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system.

The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (BSs) (or eNBs or eNode Bs), and an Access Gateway (AG) which is located at an end of a network (E-UTRAN) and which is connected to an external network. Generally, a BS can simultaneously transmit multiple data streams for a broadcast service, a multicast service and/or a unicast service.

One or more cells may exist per BS. The cell is set to use a bandwidth such as 1.25, 2.5, 5, 10, 15 or 20 MHz to provide a downlink or uplink transmission service to several UEs. Different cells may be set to provide different bandwidths. The BS controls data transmission or reception of a plurality of UEs. The BS transmits downlink (DL) scheduling information of DL data so as to inform a corresponding UE of time/frequency domain in which data is transmitted, coding, data size, and Hybrid Automatic Repeat and reQest (HARQ)-related information. In addition, the BS transmits uplink (UL) scheduling information of UL data to a corresponding UE so as to inform the UE of a time/frequency domain which may be used by the UE, coding, data size and HARQ-related information. An interface for transmitting user traffic or control traffic can be used between BSs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-A". The LTE system and the LTE-A system are different from each other in terms of system bandwidth and introduction of a relay.

The LTE-A system aims to support a wideband of a maximum of 100 MHz. The LTE-A system uses carrier aggregation or bandwidth aggregation technology which achieves the wideband using a plurality of frequency blocks.

The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier In an LTE-A system, as a UE can perform communication with a BS or cooperative nodes for cooperatively performing communication with the BS, there is a need for a new method for determining transmit power of a sounding reference signal (SRS) at the UE in a network of such an environment. A method for determining transmit power of an SRS in such a network and a method for transmitting power headroom report (PHR) for an SRS have not yet been provided. Therefore, transmit power of the UE has been inefficiently controlled.

DISCLOSURE

Technical Problem

An object of the present invention devised to solve the problem lies in a method for transmitting a power headroom report (PHR) at a user equipment (UE) in a network in which a base station and at least one cooperative node performing cooperative communication with the base station exist.

Another object of the present invention devised to solve the problem lies in a UE for transmitting a PHR in a network in which a base station and at least one cooperative node performing cooperative communication with the base station exist.

The technical problems solved by the present invention are not limited to the above technical problems and other technical problems which are not described herein will become apparent to those skilled in the art from the following description.

Technical Solution

The object of the present invention can be achieved by providing a method of transmitting a power headroom report (PHR) by a user equipment (UE) in a network in which a base station and one or more cooperative nodes for performing cooperative communication with the base station exist, the method includes determining a sounding reference signal (SRS) transmit power for transmitting an SRS in a specific serving cell, wherein the determined SRS transmit power is a value for transmission to a plurality of nodes among a first node corresponding to the base station and one or more cooperative nodes. The determined SRS transmit power may be determined based on an offset according to a trigger type of the SRS and a transmission bandwidth of the SRS as dedicated SRS in the specific serving cell. The determined SRS transmission power may be determined based on at least one of an SRS pathloss compensation factor, a SRS pathloss estimate, a value indicating a SRS power adjustment state and a value expressed by a sum of a cell-specific nominal component and a UE-specific nominal component for the SRS, for the specific serving cell.

The method may further include configuring PHR information for transmission of the PHR of the SRS based on the determined SRS transmit power, and transmitting the configured PHR information including the PHR of the SRS to at least one node of the plurality of nodes, the plurality of nodes may include a cooperative node configured in the UE or an activated cooperative node or includes a transmission point set or reception point set configured in the UE, and the PHR information may be configured for each of the plurality of nodes. The configured PHR information may be transmitted to all of the plurality of nodes or all of the cooperative nodes. The cooperative node may correspond to an antenna, a remote radio head (RRH), a pico-cell base station, a micro-cell base station, a transmission point, a reception point, a transmission point set or a reception point set. The PHR value of the SRS may be determined by subtracting the determined SRS transmit power from a maximum transmit power value configured in the UE for the specific serving cell. The configured PHR information may include PHR information configured according to predetermined order of cooperative nodes or include a cooperative node index and PHR information corresponding to the cooperative node index.

In another aspect of the present invention, provided herein is a user equipment (UE) for transmitting a power headroom report (PHR) in a network in which a base station and one or more cooperative nodes for performing cooperative communication with the base station exist, the UE includes a processor configured to determine a sounding reference signal (SRS) transmit power for transmitting a SRS in a specific serving cell, wherein the determined SRS transmit power is a value for transmission to a plurality of nodes among a first node corresponding to the base station and one or more cooperative nodes. The processor may determine the SRS transmit power based on an offset according to a trigger type of the SRS and a transmission bandwidth of the SRS as dedicated SRS in the specific serving cell. The processor may determine the SRS transmission power based on at least one of a SRS pathloss compensation factor, a SRS pathloss estimate, a value indicating a SRS power adjustment state and a value expressed by a sum of a cell-specific nominal component and a UE-specific nominal component for the SRS, for the specific serving cell. The processor may configure PHR information for transmission of the PHR of the SRS based on the determined SRS transmit power, the UE may further include a transmitter configured to transmit the configured PHR information including the PHR of the SRS to at least one of the plurality of nodes, the plurality of nodes may include a cooperative node configured in the UE or an activated cooperative node or includes a transmission point set or reception point set configured in the UE. The configured PHR information may be transmitted to all of the plurality of nodes or all of the cooperative nodes. The processor may determine PHR value of the SRS by subtracting the determined SRS transmit power from a maximum transmit power value configured in the UE for the specific serving cell.

Advantageous Effects

According to various aspects of the present invention, a PHR for a SRS is defined in a system supporting uplink/downlink communication between a plurality of nodes between macro cells or in a macro cell and a PHR is transmitted according to a new PHR triggering method and a MAC CE configuration method for PHR transmission, thereby remarkably improving communication performance.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram showing the structure of a downlink subframe of a 3GPP LTE/LTE-A system which is an example of a wireless communication system.

FIG. 7 is a diagram showing a carrier aggregation (CA) communication system.

BEST MODE FOR CARRYING OUT THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, it is assumed that the mobile communication system is a $3^{rd}$ Generation Partnership Project (3GPP) Long Term Evolution (LTE) or LTE-Advanced (LTE-A) system, the present invention is applicable to other mobile communication systems excluding the unique matters of the 3GPP LTE or LTE-A system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS) or an advanced mobile station (AMS), and a base station includes a node of a network end communicating with a terminal, such as a Node-B, an eNode B, a base station or an access point (AP).

In a mobile communication system, a UE may receive information from a BS in downlink and a UE may transmit information to a BS in uplink. Information transmitted or received by a UE includes data and a variety of control information and various physical channels exist according to the kinds and usage of information transmitted or received by the UE.

Figure 1:
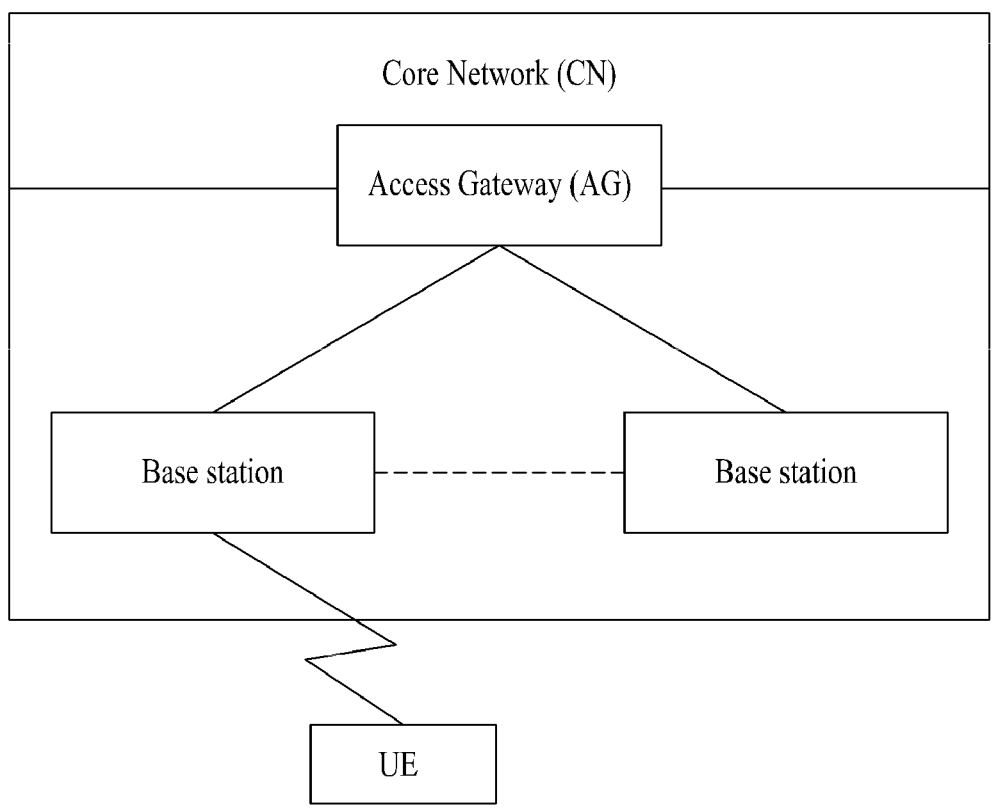
FIG. 1 is a diagram showing a network structure of an Evolved Universal Mobile Telecommunications System (E-UMTS) as an example of a wireless communication system.
Figure 2:
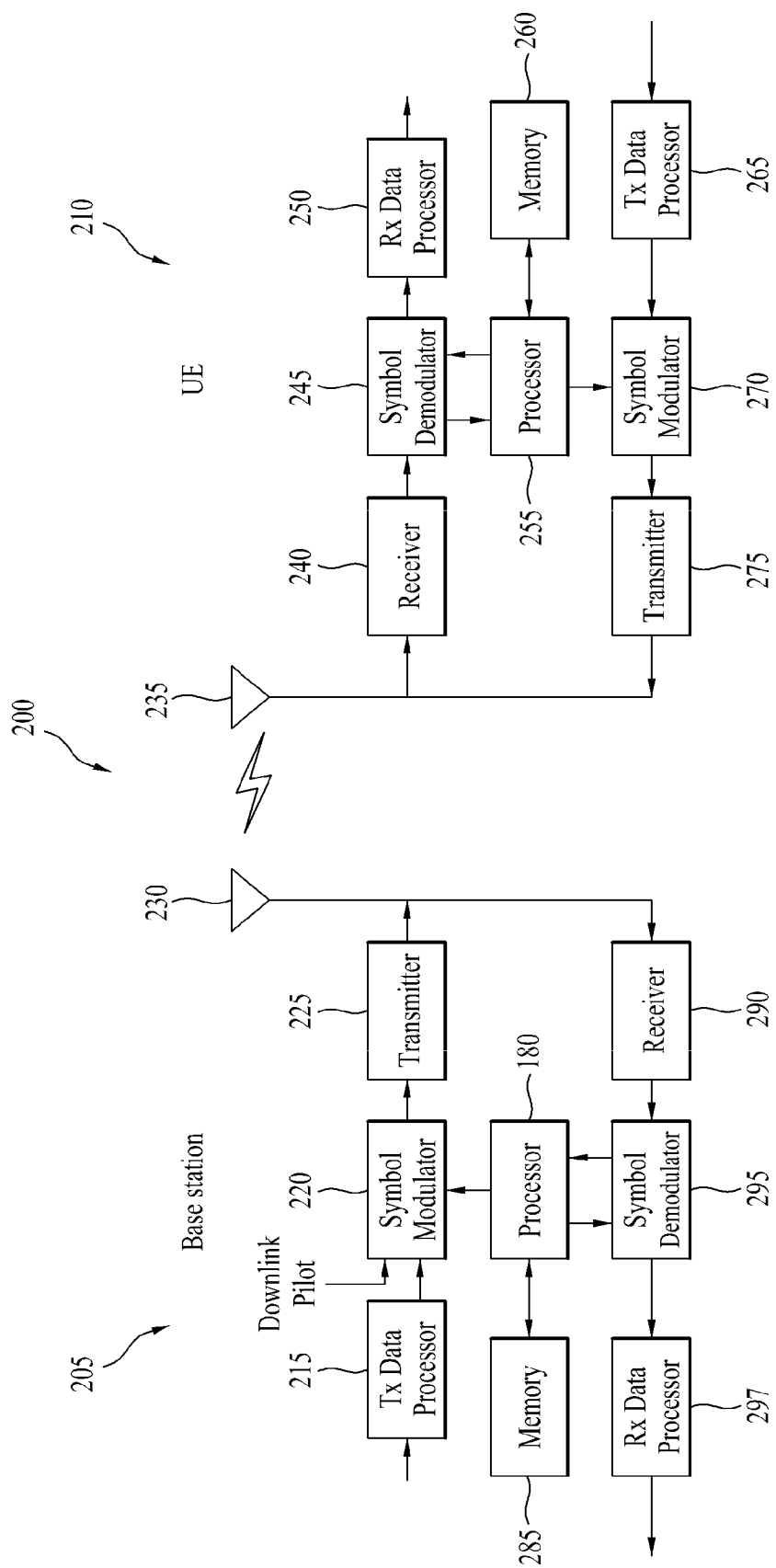
FIG. 2 is a block diagram showing the configuration of a BS 205 and a UE 210 in a wireless communication system 200.

FIG. 2 is a block diagram showing the configuration of a BS 205 and a UE 210 in a communication system 200.

Although one BS 205 and one UE 210 are shown in order to simplify the wireless communication system 200, the wireless communication system 200 may include one or more BSs and/or one or more UEs.

Referring to FIG. 2, the BS 205 may include a transmission (Tx) data processor 215, a symbol modulator 220, a transmitter 225, a Tx/Rx antenna 230, a processor 280, a memory 285, a receiver 290, a symbol demodulator 295 and a reception (Rx) data processor 297. The UE 210 may include a Tx data processor 265, a symbol modulator 270, a transmitter 275, a Tx/Rx antenna 235, a processor 255, a memory 260, a receiver 240, a symbol demodulator 255 and an Rx data processor 250. Although one antenna 230 and one antenna 235 are respectively shown as being included in the BS 205 and the UE 210, each of the BS 205 and the UE 210 may include a plurality of antennas. Accordingly, the BS 205 and the UE 210 according to the present invention support a multiple input multiple output (MIMO) system. The BS 205 according to the present invention may support both a single user (SU)-MIMO scheme and a multi user (MU)-MIMO scheme.

In downlink, the Tx data processor 215 receives traffic data, formats and codes the received traffic data, interleaves and modulates (or symbol-maps) the coded traffic data, and provides modulated symbols ("data symbols"). The symbol modulator 220 receives and processes the data symbols and pilot symbols and provides a stream of the symbols.

The symbol modulator 220 multiplexes data and pilot symbols and transmits the multiplexed data and pilot symbols to the transmitter 225. At this time, each transmitted symbol may include a data symbol, a pilot symbol, or a null signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 225 receives the stream of the symbols, converts the stream into one or more analog signals, and additionally adjusts (e.g., amplifies, filters and frequency up-converts) the analog signals, thereby generating a downlink signal suitable for transmission through a radio channel. Subsequently, the downlink signal is transmitted to a UE through the antenna 230.

In the UE 210, the antenna 235 receives a downlink signal from the BS and provides the received signal to the receiver 240. The receiver 240 adjusts (for example, filters, amplifies, and frequency down-converts) the received signal, digitalizes the adjusted signal, and acquires samples. The symbol demodulator 245 demodulates the received pilot symbols and provides the demodulated pilot signals to the processor 255, for channel estimation.

The symbol demodulator 245 receives a frequency response estimation value for downlink from the processor 255, performs data demodulation with respect to the received data symbols, acquires data symbol estimation values (which are estimation values of the transmitted data symbols), and provides the data symbol estimation values to the Rx data processor 250. The Rx data processor 250 demodulates (that is, symbol-demaps), deinterleaves and decodes the data symbol estimation values and restores the transmitted traffic data.

The processes by the symbol demodulator 245 and the Rx data processor 250 are complementary to the processes by the symbol modulator 220 and the Tx data processor 215 of the BS 205.

In the UE 210, the Tx data processor 265 processes traffic data and provides data symbols in uplink. The symbol modulator 270 receives the data symbols, multiplexes the data symbols with pilot symbols, performs modulation, and provides a stream of symbols to the transmitter 275. The transmitter 275 receives and processes the stream of symbols, generates an uplink signal, and transmits the uplink signal to the BS 205 through the antenna 235.

In the BS 205, the uplink signal is received from the UE 210 through the antenna 230. The receiver 290 processes the received uplink signal and acquires samples. Subsequently, the symbol demodulator 295 processes the samples and provides pilot symbols and data symbol estimation values received in uplink. The Rx data processor 297 processes the data symbol estimation values and restores the traffic data transmitted from the UE 210.

The respective processors 255 and 280 of the UE 210 and the BS 205 instruct (for example, control, adjust, or manage) the operations of the UE 210 and the BS 205, respectively. The processors 255 and 280 may be connected to the memories 260 and 285 for storing program codes and data, respectively. The memories 260 and 285 are respectively connected to the processor 280 so as to store operating systems, applications and general files.

The processors 255 and 280 may be called controllers, microcontrollers, microprocessors, microcomputers, etc. The processors 255 and 280 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 255 and 280.

If the embodiments of the present invention are implemented by firmware or software, the firmware or software may be configured to include modules, procedures, functions, etc. for performing the functions or operations of the present invention. The firmware or software configured to perform the present invention may be included in the processors 255 and 280 or may be stored in the memories 260 and 285 so as to be executed by the processors 255 and 280.

Layers of the radio interface protocol between the BS and the UE in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the BS exchange RRC messages with each other through a wireless communication network and the RRC layer.

Figure 3:
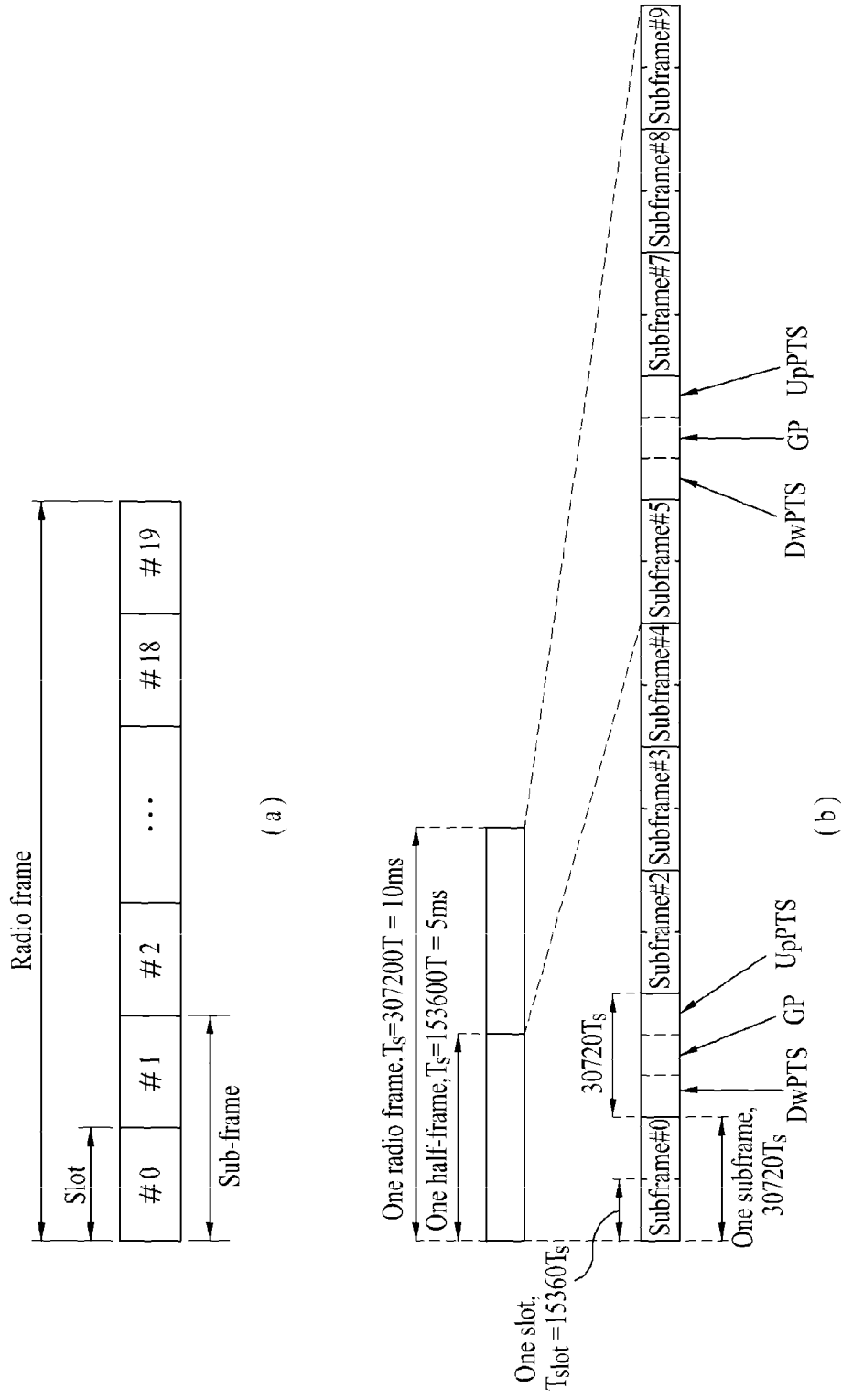
FIG. 3 is a diagram showing the structure of a radio frame used in a $3^{rd}$ Generation Partnership Project (3GPP) Long Term Evolution (LTE)/LTE-Advanced (LTE-A) system which is an example of a wireless communication system.

FIG. 3 is a diagram showing the structure of a radio frame used in a $3^{rd}$ Generation Partnership Project (3GPP) Long Term Evolution (LTE)/LTE-Advanced (LTE-A) system which is an example of a wireless communication system.

In a cellular OFDM radio packet communication system, uplink/downlink data packet transmission is performed in subframe units and one subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 3(a) shows the structure of type 1 radio frame. A downlink radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain and includes a plurality of resource blocks (RBs) in a frequency domain. In a 3GPP LTE system, since OFDM is used in downlink, an OFDM symbol indicates one symbol interval. The OFDM symbol may be referred to as an SC-FDMA symbol or symbol interval. A resource block (RB) as a resource allocation unit may include a plurality of consecutive subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 3(b) is a diagram showing the structure of the type 2 radio frame. The type 2 radio frame includes two half frames. Each half frame includes five subframes, a downlink pilot time slot (DwPTS), a guard period (GP), and an uplink pilot time slot (UpPTS). One subframe includes two slots. The DwPTS is used for initial cell search, synchronization and channel estimation at a UE. The UpPTS is used for channel estimation at a BS and uplink transmission synchronization of a UE. The guard period is used to remove interference occurring in uplink due to multi-path delay of a downlink signal between uplink and downlink.

Each half frame includes 5 subframes, a subframe "D" indicates a subframe for downlink transmission and a subframe "U" indicates a subframe for uplink transmission, a subframe "S" indicates a special subframe including DwPTS, a GP and an UpPTS. The DwPTS is used for initial cell search, synchronization and channel estimation at a UE. The UpPTS is used for channel estimation at a BS and uplink transmission synchronization of a UE. The guard period is used to remove interference occurring in uplink due to multi-path delay of a downlink signal between uplink and downlink.

In case of a 5-ms downlink-uplink switch-point period, the special subframe S is present in every half frame and, in case of a 5-ms downlink-uplink switch-point period, the special subframe is present only in a first half frame. The subframe indices 0 and 5 and the DwPTS are only used for downlink transmission. The UpPTS and the subframe next to the special subframe are always used for uplink transmission. When multi-cells are aggregated, the UE may assume the same uplink-downlink configuration over all cells and the GPs of the special subframes of different cells overlap by at least 1456 Ts. The structure of the radio frame is only exemplary. Accordingly, the number of subframes included in the radio frame, the number of slots included in the subframe or the number of symbols included in the slot may be changed in various manners.

Table 1 below shows the configuration of the special frame (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 below shows an uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 2-continued

| Uplink-downlink configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in a 3GPP LTE system, in type 2 frame structure, 7 uplink-downlink configurations are present. The locations or numbers of downlink subframes, special frames or uplink subframes may differ between configurations. Hereinafter, various embodiments of the present invention will be described based on the uplink-downlink configurations of the type 2 frame structure shown in Table 2.

The structure of the radio frame is only exemplary. Accordingly, the number of subframes included in the radio frame, the number of slots included in the subframe or the number of symbols included in the slot may be changed in various manners.

Figure 4:
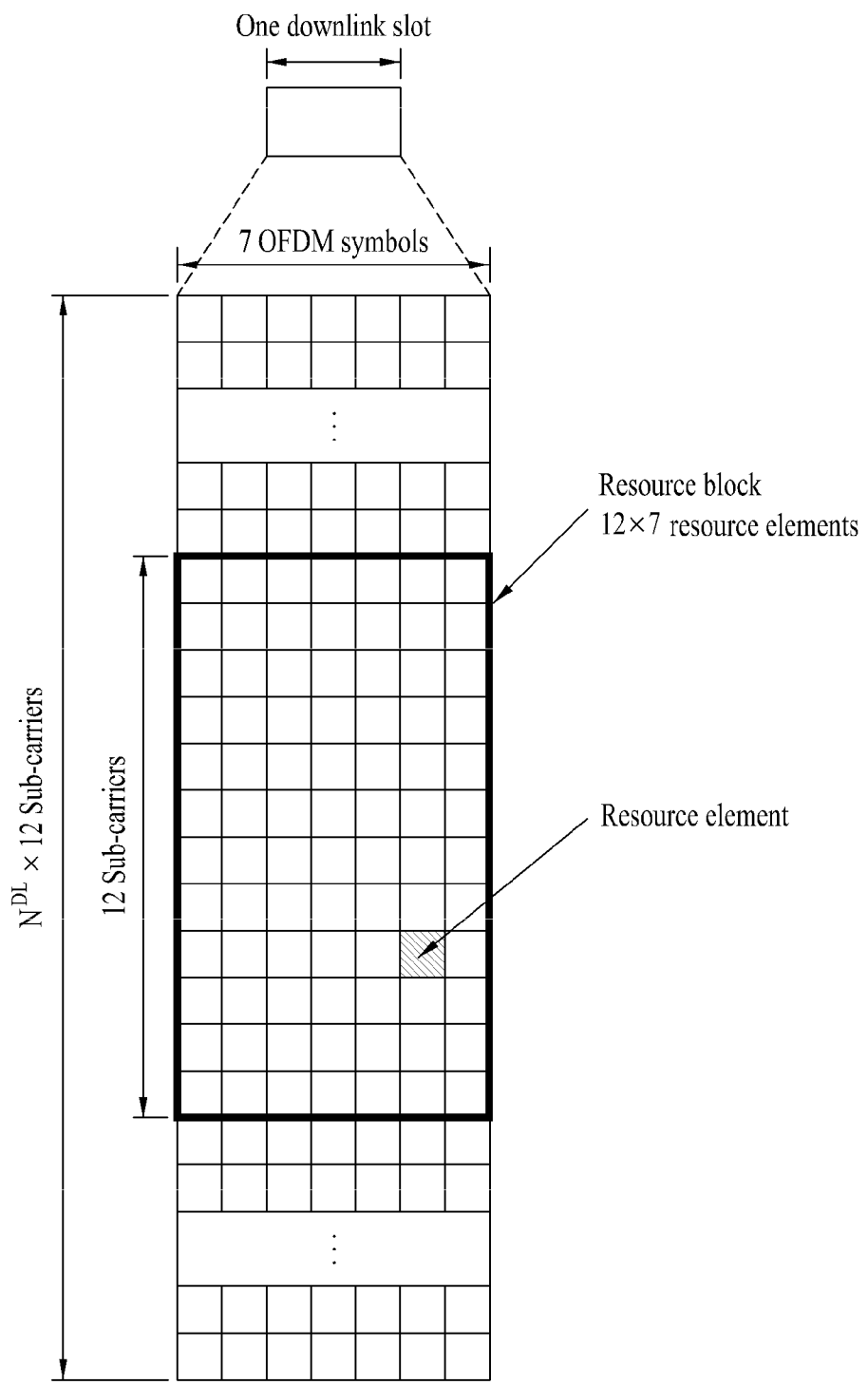
FIG. 4 is a diagram showing resource grid of a downlink slot of a 3GPP LTE/LTE-A system which is an example of a wireless communication system.

FIG. 4 is a diagram showing resource grid of a downlink slot of a 3GPP LTE/LTE-A system which is an example of a wireless communication system.

Referring to FIG. 4, a downlink slot includes a plurality of OFDM symbols in a time domain. One downlink slot may include seven (six) OFDM symbols and one RB may include 12 subcarriers in a frequency domain. Each element on the resource grid is referred to as a resource element (RE). One RB includes 12×7(6) REs. The number NRB of RBs included in a downlink slot depends on a downlink transmission bandwidth. The structure of the uplink slot may be equal to the structure of the downlink slot, except that an OFDM symbol is replaced with an SC-FDMA symbol.

FIG. 5 is a diagram showing the structure of a downlink subframe of a 3GPP LTE/LTE-A system which is an example of a wireless communication system.

Referring to FIG. 5, a maximum of three (four) OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission.

The control information transmitted through the PDCCH is referred to as Downlink Control Information (DCI). In the DCI format, format 0 is defined for uplink and formats 1, 1A, 1B, 1C, 1D, 2, 2A, 3 and 3A are defined for downlink. The DCI format selectively includes hopping flag, RB allocation, modulation coding scheme (MCS), redundancy version (RV), new data indicator (NDI), transmit power control (TPC), cyclic shift demodulation reference signal (DM RS), channel quality information (CQI) request, HARQ processor number, transmitted precoding matrix indicator (TPMI), precoding matrix indicator (PMI) confirmation, etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of PDCCH bits are determined based on the number of CCEs. The BS determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 6:
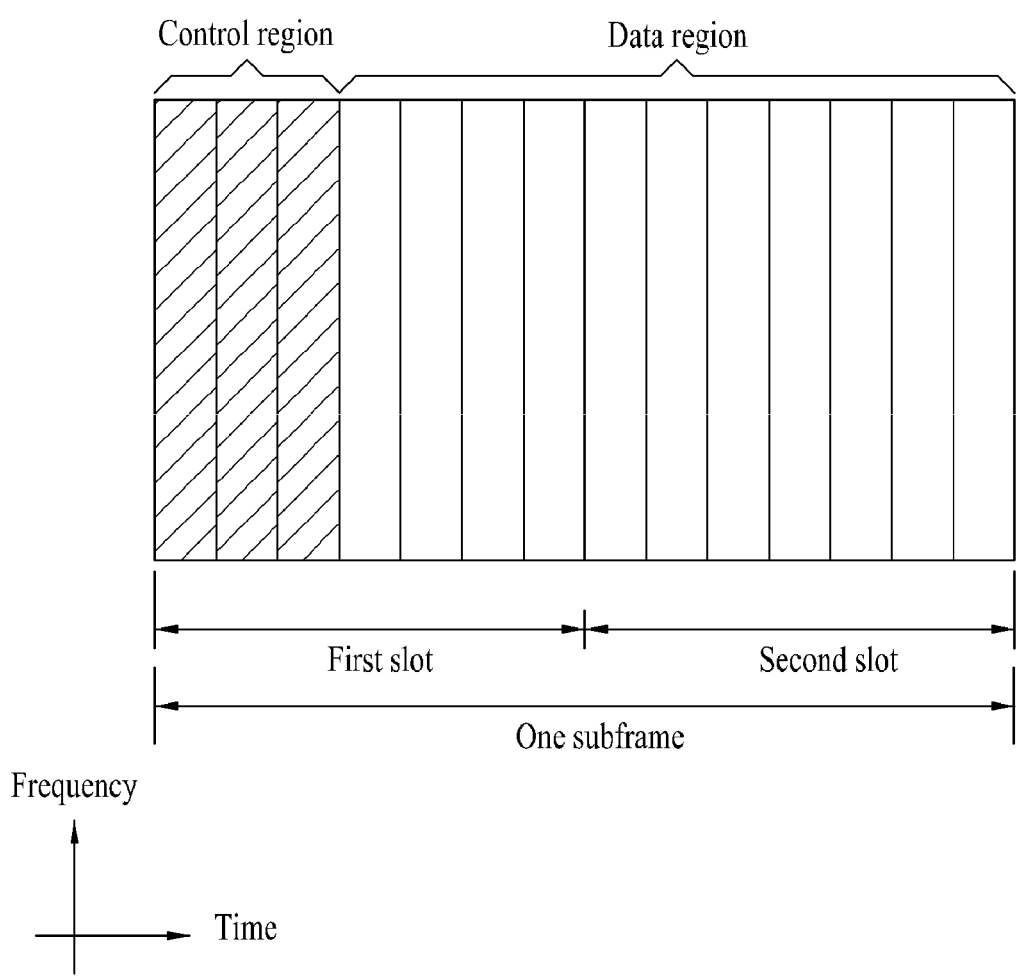
FIG. 6 is a diagram showing the structure of an uplink subframe of a 3GPP LTE/LTE-A system which is an example of a wireless communication system.

FIG. 6 is a diagram showing the structure of an uplink subframe of a 3GPP LTE/LTE-A system which is an example of a wireless communication system.

Referring to FIG. 6, the uplink subframe includes a plurality (e.g., 2) of slots. The slot may include SC-FDMA symbols, the number of which is changed according to CP length. The uplink subframe may be divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.

Scheduling request (SR): Information used to request uplink (UL)-SCH resources. This is transmitted using an on-off keying (OOK) method.

HARQ ACK/NACK: Response signal to downlink data packets on a PDSCH. This indicates whether downlink data packets are successfully received. 1-bit ACK/NACK is transmitted in response to a single downlink codeword and 2-bit ACK/NACK is transmitted in response to two downlink codewords.

Channel quality indicator (CQI): Feedback information for a downlink channel. Multiple input multiple output (MIMO)-related feedback information includes a rank indicator (RI) and a precoding matrix indicator (PMI). 20 bits are used per subframe.

The amount of control information (UCI) transmittable by a UE in a subframe depends on the number of SC-FDMA symbols available in control information transmission. The SC-FDMA symbols available in control information transmission mean SC-FDMA symbols excluding SC-FDMA symbols for reference signal transmission in a subframe, and a last SC-FDMA symbol of the subframe is also excluded in case of a subframe in which a sounding reference signal (SRS) is set. A reference signal is used for coherent detection of a PUCCH. The PUCCH supports 7 formats according to transmitted information.

Table 3 shows a mapping relationship between PUCCH format and UCI in LTE.

TABLE 3

| PUCCH format | Uplink control information (UCI) |
| --- | --- |
| Format 1 | Scheduling request (SR) (unmodulated waveform) |
| Format 1a | 1-bit HARQ ACK/NACK (SR presence/absence) |
| Format 1b | 2-bit HARQ ACK/NACK (SR presence/absence) |
| Format 2 | CQI (20 coded bits) |
| Format 2 | CQI and 1- or 2-bit HARQ ACK/NACK (20 bits) (only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

FIG. 7 is a diagram showing a carrier aggregation (CA) communication system.

An LTE-A system uses carrier aggregation or bandwidth aggregation technology to aggregate a plurality of uplink/downlink frequency bands to use a larger uplink/downlink band in order to use a wider frequency band. Each small frequency bandwidth is transmitted using a component carrier (CC). The component carrier may be understood as a carrier frequency (or a center carrier or a center frequency) for a frequency block.

CCs may or may not be contiguous to each other in the frequency domain. The bandwidth of each CC may be restricted to the bandwidth of a legacy system for backward compatibility with the legacy system. For example, in a legacy 3GPP LTE system, bandwidths of 1.4, 3, 5, 10, 15, and 20 MHz are supported and, in an LTE-A system, a bandwidth of more than 20 MHz may be supported using the above-described bandwidths supported by the LTE system. The bandwidth of each CC may be independently set. Asymmetric carrier aggregation in which the number of UL CCs and the number of DL CCs are different is possible. The DL CC/UL CC link may be fixed or semi-static. For example, as shown in FIG. 6(a), if the number of DL CCs is 4 and the number of UL CCs is 2, a DL-UL linkage configuration of DL CC:UL CC=2:1 is possible. Similarly, as shown in FIG. 6(b), if the number of DL CCs is 2 and the number of UL CCs is 4, a DL-UL linkage configuration of DL CC:UL CC=1:2 is possible. Unlike FIG. 7, symmetric carrier aggregation in which the number of DL CCs is equal to the number of UL CCs and, in this case, a DL-UL linkage configuration of DL CC:UL CC=1:1 is possible.

In addition, although an overall system bandwidth includes N CCs, a frequency bandwidth monitored/received by a specific UE may be restricted to M (<N) CCs. Various parameters of carrier aggregation may be set in a cell-specific, UE group-specific or UE-specific manner. Control information may be set to be transmitted and received only via a specific CC. Such a specific CC may be referred to as a primary CC (PCC) and the remaining CCs may be referred to as secondary CCs (SCCs).

LTE-A uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If carrier aggregation is supported, linkage between a carrier frequency (or a DL CC) of downlink resources and a carrier frequency (or a UL CC) of uplink resources may be indicated by system information. A cell operating on a primary frequency (e.g., a primary CC (PCC)) may be referred to as a PCell and a cell operating on a secondary frequency (e.g., a secondary CC (SCC)) may be referred to as an SCell.

The PCell is used for a UE to perform an initial connection establishment process or a connection re-establishment process. The PCell may refer to a cell indicated in a handover procedure. The SCell may be configured after RRC connection establishment and may be used to provide additional radio resources. The PCell and the SCell may be collectively referred to as a serving cell. In the case of a UE which is in an RRC_CONNECTED state but does not establish or support carrier aggregation, only one serving cell including the PCell exists. In the case of a UE which is in an RRC_CONNECTED state and establishes carrier aggregation, one or more serving cells exist and the serving cells include the PCell and all SCells. For carrier aggregation, a network may be added to the PCell initially configured in a connection establishment process and one or more SCells may be configured for a UE supporting carrier aggregation, after an initial security activation process is initiated.

Unlike the legacy LTE system using one carrier, in carrier aggregation using a plurality of CCs, there is a need for a method of efficiently managing component carriers. In order to efficiently manage CCs, CCs may be classified according to the roles and characteristics thereof. In carrier aggregation, multiple carriers may be classified into a primary component carrier (PCC) and a secondary component carrier (SCC) and may be UE-specific parameters.

The PCC is used as a center component carrier of CC management when multiple CCs are used, and one PCC is allocated to one UE. The PCC is a kernel carrier that manages all integrated CCs, and the remaining SCCs may provide additional frequency resources to achieve a high transfer rate. For example, the BS may achieve RRC for signaling with a UE through a primary component carrier (PCC). Information for security and higher layer signaling may also be achieved through a PCC. Indeed, if there is only one CC, the corresponding CC may be used as a PCC. In this case, the corresponding CC may perform the same role as a carrier of the legacy LTE system.

The BS may allocate an activated component carrier (ACC) from among multiple CCs to a UE. The UE can previously recognize the ACC allocated thereto. The UE may collect responses to a plurality of PDCCHs received from a downlink PCell and downlink SCells and transmit the responses to an uplink PCell via a PUCCH.

Hereinafter, a 3GPP LTE or LTE-A system may support uplink/downlink communication between macro cells or between a plurality of nodes or points within a macro cell. In this case, it is necessary to report the power status of the UE to the BS and to support a power headroom report (PHR) therefor. As a power status report or power headroom report (PHR) considering the case of supporting uplink/downlink communication between macro cells or the plurality of nodes within the macro cell is necessary, there is a need for basic definition of the PHR and additional design for a triggering condition or a message format (message information type or size).

Prior to a description of a PHR configuration according to the present invention, an uplink power control method in a 3GPP LTE or LTE-A system and PHR definition will be briefly described.

First, hereinafter, a determination of transmit power of a UE for PUSCH transmission in a 3GPP LTE or LTE-A system will be described. Equation 1 below shows an equation for determining transmit power of a UE when a PUCCH is not simultaneously transmitted but only a PUSCH is transmitted in a subframe having an index i of a serving cell c in a CA system.

$$P_{PUSCH,c}(i) = \min \left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} \quad \text{Equation 1}$$

$$P_{PUSCH,c}(i) = \min \left\{ \begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} [dBm] \quad \text{Equation 2}$$

Equation 2 shows an equation for determining PUSCH transmit power when a PUCCH and a PUSCH are simultaneously transmitted in a subframe having an index i of a serving cell c in a CA system.

In Equations 1 and 2, parameters necessary to determine uplink transmit power of the UE are for the serving cell c.

Here, $P_{CMAX,c}(i)$ of Equation 1 denotes maximum transmit power of the UE in a subframe having an index i, $\hat{P}_{CMAX,c}(i)$ of Equation 2 denotes a linear value of $P_{CMAX,c}(i)$. $\hat{P}_{PUCCH}(i)$ of Equation 2 denotes a linear value of $P_{PUCCH}(i)$ (here, $P_{PUCCH}(i)$ denotes PUCCH transmit power in a subframe having an index i.

In Equation 1, $M_{PUSCH,c}(i)$ is a parameter indicating the bandwidth of PUSCH resource assignment expressed in the number of resource blocks valid for a subframe having an index i and is allocated by the BS. $P_{O\_PUSCH,c}(j)$ is a parameter composed of a sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled from the BS to the UE. $\alpha_c(j)$ is a pathloss compensation factor and is a 3-bit cell-specific parameter provided by the higher layer and transmitted by the BS. When j=0 or 1, $\alpha_c \in \{0, 0.4, 0.5, 0.6, 0.7, 0.8, 0.9, 1\}$ and when j=2, $\alpha_c(j)=1$. $\alpha_c(j)$ is signaled from the BS to the UE.

Pathloss $PL_c$ is a downlink pathloss (or signal loss) estimate calculated by the UE in dB, is expressed by $PL_c$=referenceSignalPower−higher layer filteredRSRP and referenceSignalPower may be signaled from the BS to the UE via a higher layer.

$f_c(i)$ is a value indicating a current PUSCH power control adjustment status in a subframe having an index i and may be expressed by a current absolute or accumulated value. If accumulation is enabled based on the parameter Accumulation-enabled provided by the higher layer or if the TPC command $\delta_{PUSCH,c}$ is included in a PDCCH with DCI format 0 for the serving cell c where the CRC is scrambled by the temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled on the PDCCH with DCI format 0/4 or 3/3A on a subframe i-$K_{PUSCH}$, where $f_c(0)$ is the first value after reset of accumulation.

The value of $K_{PUSCH}$ is defined in the LTE standard as follows.

For Frequency Division Duplex (FDD), the value of $K_{PUSCH}$ is 4. For TDD UL/DL configurations 1-6, the value of $K_{PUSC}$ is shown in Table 4 below. For TDD UL/DL configuration 0, if PUSCH transmission in subframe 2 or 7 is scheduled with a PDCCH of DCI format 0/4 in which the least significant bit (LSB) of the UL index is set to 1, $K_{PUSCH}$=7. For all other PUSCH transmissions, the value of $K_{PUSCH}$ is given in Table 4 below.

TABLE 4

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX. If DCI format 0/4 for the serving cell c and DCI format 3/3A are both detected in the same subframe, then the UE shall use $\delta_{PUSCH,c}$ provided in DCI format 0/4. $\delta_{PUSCH,c}$=0 dB for a subframe where no TPC command is decoded for the serving cell c or where DRX occurs or i is not an uplink subframe in TDD.

The $\delta_{PUSCH,c}$ accumulated values signalled on the PDCCH with DCI format 0/4 are given in Table 5. If the PDCCH with DCI format 0 is validated as a SPS activation or the PDCCH is released, then $\delta_{PUSCH,c}$ is 0 dB. The $\delta_{PUSCH,c}$ dB accumulated values signalled on the PDCCH with DCI format 3/3A are one of SET1 given in Table 5 or SET2 given in Table 6 as determined by the parameter TPC-index provided by the higher layer.

TABLE 5

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 6

| TPC Command Field in DCI format 3A | Accumulated $\delta_{PUSCH,c}$ [dB] |
|---|---|
| 0 | −1 |
| 1 | 1 |

If the UE has reached $P_{CMAX,c}$ for the serving cell c, positive TPC commands for the serving cell c shall not be accumulated. If the UE has reached minimum power, negative TPC commands shall not be accumulated.

For the serving cell c, when $P_{O\_UE\_PUSCH,c}$ value is changed by the higher layer and when the UE receives a random access response message, the UE shall reset accumulation.

$f_c(i)=\delta_{PUSCH,c}(i-K_{PUSCH})$ is satisfied if accumulation is not enabled for the serving cell c based on the parameter Accumulation-enabled provided by the higher layer.

Here, $\delta_{PUSCH,c}(i-K_{PUSCH})$ was signalled on PDCCH with DCI format 0/4 for the serving cell c on subframe $i-K_{PUSCH}$.

The value of $K_{PUSCH}$ is 4 for Frequency Division Duplex (FDD). For TDD UL/DL configurations 1-6, the value of $K_{PUSCH}$ is shown in Table 4. For TDD UL/DL configuration 0, if the PUSCH transmission in subframe 2 or 7 is scheduled with a PDCCH of DCI format 0/4 in which the LSB of the UL index is set to 1, $K_{PUSCH}=7$. For all other PUSCH transmissions, $K_{PUSCH}$ is given in Table 4.

The $\delta_{PUSCH,c}$ accumulated values signalled on the PDCCH with DCI format 0/4 are given in Table 5. If the PDCCH with DCI format 0 is validated as a SPS activation or the PDCCH is released, then $\delta_{PUSCH,c}$ is 0 dB.

For a subframe where no PDCCH with DCI format 0/4 is decoded for the serving cell c or where DRX occurs or i is not an uplink subframe in TDD, $f_c(i)=f_c(i-1)$.

For both types of $f_c(*)$ (accumulation or current absolute), the first value is set as follows:

For the serving cell c, if $P_{O\_UE\_PUSCH,c}$ value is changed by the higher layer or if $P_{O\_UE\_PUSCH,c}$ value is received by the higher layers and the serving cell c is a secondary cell, $f_c(0)=0$.

If the serving cell c is a primary cell, $f_c(0)=\Delta P_{rampup}+\delta_{msg2}$. $\delta_{msg2}$ is a TPC command indicated in the random access response, and $\Delta P_{rampup}$ is provided by the higher layer and corresponds to the total power ramp-up from the first to the last preamble.

Equation 3 below shows uplink power for uplink control channel transmission of the UE in LTE Release-8 in dB.

$$P_{PUCCH}(i)=\min\{P_{CMAX},P_{O\_PUCCH}+PL+ h(n_{CQI},n_{HARQ})+\Delta_{F\_PUCCH}(F)+g(i)\} \quad \text{Equation 3}$$

where, i denotes a subframe index, $P_{CMAX}$ denotes maximum transmit power of the UE, $P_{O\_PUCCH}$ denotes a parameter composed of a sum of cell-specific parameters and is signaled by the BS via higher layer signaling, PL denotes a downlink pathloss (or signal loss) estimate calculated by the UE in dB and is expressed by PL=referenceSignalPower− higher layer filteredRSRP. h(n) is changed according to PUCCH format, $n_{CQI}$ denotes the number of information bits of channel quality information (CQI), and $n_{HARQ}$ denotes the number of HARQ bits. The value of $\Delta_{F\_PUCCH}(F)$ is a relative value of PUCCH format 1a, which corresponds to PUCCH format (f), and is signaled by the BS via higher layer signaling. g(i) denotes a current PUCCH power control adjustment state of a subframe having an index i. $h(n_{CQI},n_{HARQ})$ is 0 in PUCCH formats 1, 1a and 1b and is expressed by Equation 4 below in PUCCH formats 2, 2a and 2b in case of normal cyclic prefix (CP).

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad \text{Equation 4}$$

Table 7 below shows $\delta_{PUCCH}$ values mapped to TPC command fields in DCI format 1A/1B/1D/1/2A/2/3 and Table 8 below shows a table indicating $\delta_{PUCCH}$ values mapped to TPC command fields in DCI format 3A. Here, $\delta_{PUCCH}$ indicates a UE-specific correction value (or power correction value).

TABLE 7

| TPC Command Field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 8

| TPC Command Field in DCI format 3A | $\delta_{PUCCH}$ [dB] |
|---|---|
| 0 | −1 |
| 1 | 1 |

In an LTE-A system employing carrier aggregation technology, the BS may allocate an activated component carrier (ACC) from among multiple CCs to a UE. The UE can previously recognize the ACC allocated thereto. In the present invention, the UE should report a power headroom (PH) to the BS in the ACC allocated thereto in carrier units. However, for unscheduled carriers among one or more ACCs allocated to the UE, the UE may transmit a virtual PHR.

Hereinafter, a method of, at a BS, signaling a power control message to a UE in order to enable the UE to report a power headroom according to carrier aggregation technology employed in an LTE-A system will be described.

According to the LTE standards (3GPP TS 36.321, 36.213 and 36.133), a media access control (MAC) control element transmitted by the UE includes a buffer status report (BSR) control element and a power headroom report (PHR) control element. The BSR control element is generated in a buffer status report process and the amount of data in an uplink buffer of the UE is reported to a BS for providing a service. The PHR control element is generated in a PHR process and the UE reports a current power status (remaining power amount) to the BS. The BS may validly distribute radio resources and execute scheduling decision according to information such as the uplink buffer status and power headroom reported by the UE.

In general, the UE may trigger (generate) a PHR when the following events are generated.

(1) when a timer prohibitPHR-Timer for prohibiting a PHR is stopped and change in pathloss using the UE is greater than a predetermined value DL_PathlossChange, and (2) when a periodic report timer PeriodicPHR-Timer is expired, which is referred to a periodic PHR. If the UE currently includes uplink transmit resources newly transmitted by the BS at a transmit time interval after the PHR is generated, a corresponding PHR control element is generated from the power headroom value acquired at a physical layer and the timer prohibitPHR-timer operates again.

If the periodic power headroom report is generated, the periodic report timer PeriodicPHR-Timer operates again. For detailed operation of the power headroom report process, refer to related technical standards 3GPP TS 36.321, 36.213 and 36.133.

As carrier aggregation (CA) technology has been introduced in an LTE-A system which is a next-generation communication system, there is a need for a method for reporting a power headroom in a multi-carrier system. As the component carrier (CC) described in the present specification, one CC may be used or a bundle of consecutive or non-consecutive CCs (e.g., a band) may be used.

In an LTE system, in order to satisfy single carrier characteristics, the UE does not simultaneously transmit a PUCCH and a PUSCH in uplink. However, as multicarrier is introduced in an LTE-A system, the UE may simultaneously transmit a PUCCH and a PUSCH. Accordingly, since the UE can simultaneously transmit the PUCCH and the PUSCH, definition of an additional PH is necessary, which is defined as a PHR type. In addition, a PH needs to be defined according to CC for multiple uplink component carriers (CCs). In addition, as multicarrier is introduced, there is a need for a method for reducing uplink signaling overhead when configuring a PH.

In an LTE-A system, a power headroom (PH) for a PUSCH and a power headroom for a PUCCH may be defined.

In the LTE-A system, there are two PHR types of the UE (Type 1 and Type 2).

Equation 5 below defines a PH of a UE when a PUSCH is transmitted without a PUCCH in a subframe having an index i for a serving cell c as PHR Type 1.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_v + \Delta_{TF,c}(i) + f_c(i)\} \quad \text{Equation 5}$$

In Equation 5 above, c denotes the index of the serving cell and each parameter of Equation 5 above is for a specific serving cell c. $P_{CMAX,c}$ denotes configured UE maximum transmit power for the specific serving cell c and $M_{PUSCH,c}(i)$ denotes the bandwidth of PUSCH resource assignment expressed in the number of resource blocks valid for a subframe having an index i at the specific serving cell c and is assigned by the BS. $P_{O\_PUSCH,c}(j)$ denotes a parameter composed of a sum of a cell-specific nominal component $P_{O\_NOMINAL\_PUSCH,c}(i)$ provided from the higher layer and a UE-specific component $P_{O\_UE\_PUSCH,c}(i)$ provided by the higher layer for the specific serving cell c and is signaled from the BS to the UE. $\alpha_c(j)$ is a 3-bit cell-specific parameter which is provided by the higher layer and is transmitted by the BS.

When j=0 or 1, $\alpha_c \in \{0, 0.4, 0.5, 0.6, 0.7, 0.8, 0.9, 1\}$ and, when j=2, $\alpha_c(j)=1$. $\alpha_c(j)$ is signaled from the BS to the UE.

$PL_c$ denotes a downlink pathloss (or signal loss) estimate calculated by the UE in dB and is expressed by PLc=referenceSignalPower−higher layer filteredRSRP. fc(i) denotes a current PUSCH power control adjustment state and may be expressed by a current absolute or accumulated value.

The PH is composed of a 64-level value in the range of −23 dB to 40 dB with steps of 1 dB and is delivered from the physical layer to the higher layer. The PH MAC control element is identified by a MAC PDU subheader. An example of a PH reported by the UE to the BS is shown in Table 9 below.

TABLE 9

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Equation 4 below defines a PH of a UE when a PUSCH and a PUCCH are transmitted in a subframe having an index i for the serving cell c as PHR Type 1.

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} [dB] \quad \text{Equation 6}$$

In Equation 6 above, $\tilde{P}_{CMAX,c}(i)$ is calculated on the assumption that only the PUSCH is transmitted in the subframe having the index i. In this case, the physical layer delivers $\tilde{P}_{CMAX,c}(i)$ to the higher layer, instead of $P_{CMAX,c}(i)$.

When the UE does not transmit the PUSCH in the subframe having the index i, the power headroom for Type 1 may be computed using Equation 7 below.

$$PH_{type1,c}(i) = \tilde{P}_{CMAX,c}(i) - \{P_{O\_PUSCH,c}(1) + \alpha_c(1) \cdot PL_c + f_c(i)\} [db] \quad \text{Equation 7}$$

In this case, $\tilde{P}_{CMAX,c}(i)$ is calculated on the assumption of MPR=0 dB, A-MPR=0 dB, P-MPR=0 dB and $T_c$=0 dB.

Equation 8 below shows Type 2 PHR. The power headroom for a Type 2 report when the UE simultaneously transmits the PUCCH and the PUSCH in the subframe i for the primary cell is computed using Equation 8.

$$PH_{type2}(i) = P_{CMAX,c}(i) - 10\log_{10}\left( 10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUCCH}+PL_c+h(n_{CQI},n_{HARQ},n_{SR})+\Delta_{F\_PUCCH}(F)+\Delta_{TxD}(F')+g(i))/10} \right) [dB] \quad \text{Equation 8}$$

The parameters described in Equation 8 above are different from the parameters described in Equation 1 in that the parameters are for the primary cell and the meaning thereof is equal to that described in Equation 3 above.

Equation 9 below shows a power headroom for a type report computed when the PUSCH is transmitted without the PUCCH in the subframe having the index i for the primary cell.

$$PH_{type2}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{O\_PUCCH}+PL_c+g(i))/10}\right)$$   Equation 9

Equation 10 below shows a power headroom for a type report computed when the PUCCH is transmitted without the PUSCH in the subframe having the index i for the primary cell.

$$PH_{type2}(i) = P_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH}+PL_c+h(n_{CQI},n_{HARQ},n_{SR})+\Delta_{F\_PUCCH}(F)+\Delta_{TxD}(F')+g(i))/10}\right)$$   Equation 10

Here, the parameters follow definition of section 5.1.2.1 of 36.213.

Equation 11 below shows a power headroom for a type report computed when the PUCCH or the PUCCH is not transmitted in the subframe having the index i for the primary cell.

$$PH_{type2}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH}+PL_c+g(i))/10}\right)$$   Equation 11

Here, the parameters follow definition of sections 5.1.1.1 and 5.1.2.1 of 36.213.

Equation 12 below shows transmit power $P_{SRS}$ of the UE for a sounding reference signal (SRS) transmitted in the subframe for the index i for the serving cell c.

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j)\cdot PL_c + f_c(i)\}[dBm]$$   Equation 12 where, $P_{CMAX,c}(i)$ is a value composed of the transmit power of the UE in the subframe having the index i for the serving cell c, $P_{SRS\_OFFSET,c}(m)$ is a 4-bit parameter semi-statically configured by the higher layer for m=0 and m=1 for the serving cell c. For SRS transmission given trigger type 0 then m=0 and for SRS transmission given trigger type 1 then m=1. For $K_S$=1.25, $P_{SRS\_OFFSET,c}(m)$ has 1 dB step size in the range of [−3, 12] dB. For $K_S$=0, $P_{SRS\_OFFSET,c}(m)$ has 1.5 dB step size in the range [−10.5, 12] dB. $M_{SRS,c}$ is the bandwidth of the SRS transmission in subframe having the index i for the serving cell c expressed in number of resource blocks. $f_c(i)$ is the current PUSCH power control adjustment state for the serving cell c. $P_{O\_PUSCH,c}(j)$ and $\alpha_c(j)$ are parameters as defined in Section 5.1.1.1 of 36.213, where j=1.

If the total transmit power of the UE for the SRS exceeds $\hat{P}_{CMAX}(i)$, the UE may scale $\hat{P}_{SRS,c}(i)$ for the serving cell c in subframe having the index i under the condition of Equation 13 below.

$$\sum_c w(i)\cdot \hat{P}_{SRS,c}(i) \le \hat{P}_{CMAX}(i)$$   Equation 13

In Equation 13 above, $\hat{P}_{SRS,c}(i)$ is a linear value of $P_{SRS,c}(i)$, w(i) is a scaling factor of $\hat{P}_{SRS,c}(i)$ for the serving cell c, where 0<w(i)≤1. The values w(i) are the same across serving cells.

Hereinafter, a PHR transmission method of an SRS, a new PHR triggering condition and a MAC CE configuration method for PHR transmission applicable to an environment shown in FIG. 8 will be described with reference to FIG. 8.

Figure 8:
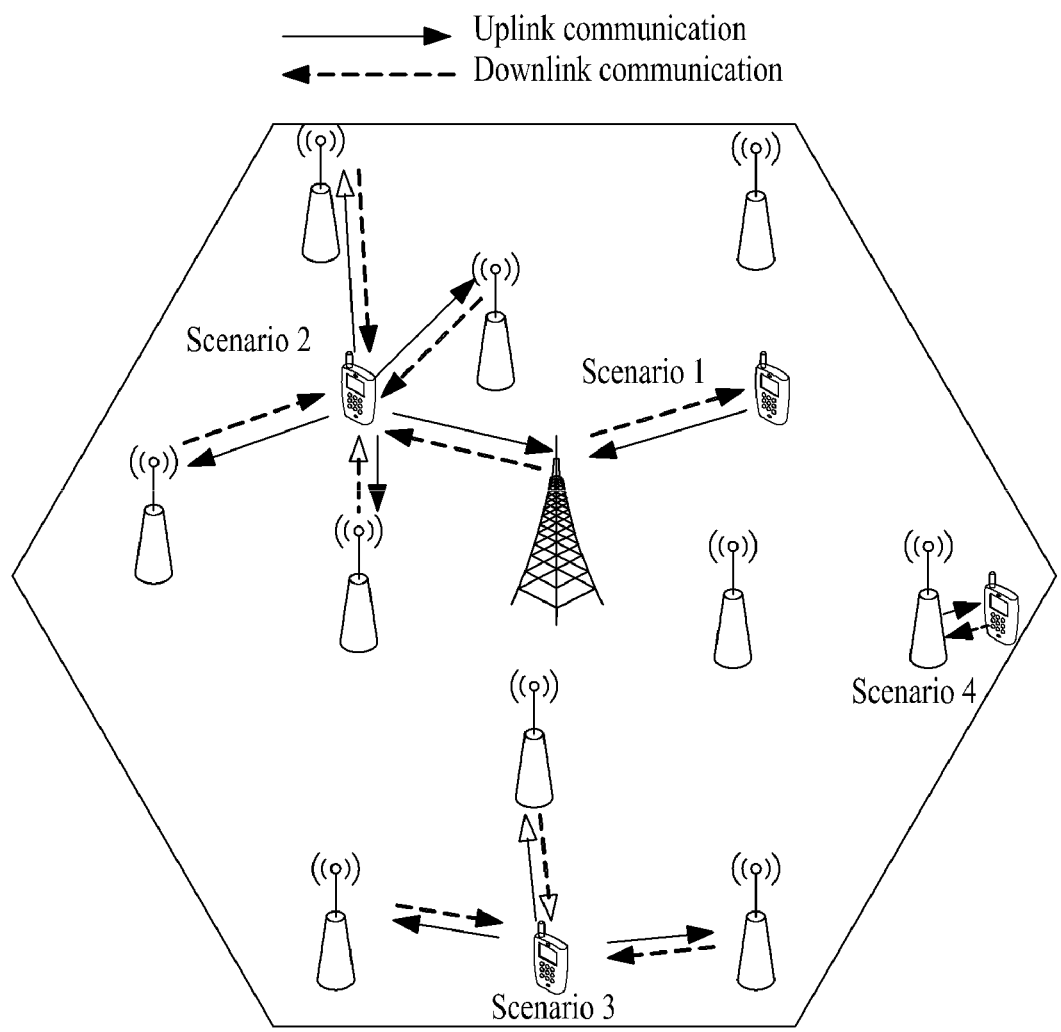
FIG. 8 is a diagram showing an example of multiple-point communication scenarios.

FIG. 8 is a diagram showing an example of multiple-point communication scenarios.

Referring to FIG. 8, Scenario 1 corresponds to the case in which a UE performs 1:1 communication with a macro BS (or macro cell BS) in a macro cell. Scenario 2 corresponds to the case in which a UE communicates with a macro BS and four cooperative nodes, Scenario 3 corresponds to the case in which a UE communicates with three cooperative nodes excluding a macro BS, and Scenario 4 corresponds to the case in which a UE performs 1:1 communication with a cooperative node. FIG. 8 shows exemplary cooperative communication scenarios among the UE, the macro BS and the cooperative nodes. The present invention is not limited to such scenarios and the number of cooperative nodes is not limited to the number of cooperative nodes shown in FIG. 8.

The cooperative nodes shown in FIG. 8 may cooperatively operate together with the macro BS and may transmit or receive a signal to or from the UE. Such cooperative nodes are applicable to a distributed antenna in a distributed antenna system (DAS), a remote radio head (RRH) having low power, a pico/femto cell cooperative system (HetNet), or a combination thereof. Such cooperative nodes may be called points, reception points, transmission points, etc. The DAS, the RRH, etc. in which the cooperative node may operate will be briefly described.

In the DAS, one BS or one BS controller for managing a plurality of antennas located at a predetermined interval within an arbitrary geographical area (also referred to as a cell) and a plurality of distributed antennas connected via a cable or a dedicated line are used for communication. In the DAS, each antenna or each antenna group may be a cooperative node of the present invention and each antenna of the DAS may operate as a subset of antennas included in one BS or one BS controller. That is, the DAS is a multiple node system and a distributed antenna or antenna group is a node of a multiple antenna system. The DAS is different from a centralized antenna system (CAS), in which a plurality of antennas is concentrated at the center of a cell, in that the plurality of antennas included in the DAS is located at a predetermined interval in the cell. The DAS is different from a femto/pico cell cooperative system in that the all antennas located in the cell are not managed by the distributed antennas or distributed antenna groups but are managed by one BS or one BS controller at the center of the cell. The DAS is different from a relay system or an ad-hoc network using a relay station (RS) and a wirelessly connected BS in that the distributed antennas are connected to each other via a cable or a dedicated line. In addition, the DAS is different from a repeater for amplifying a signal and transmitting the amplified signal in that a distributed antenna or distributed antenna group may transmit a signal different from that of another distributed antenna or distributed antenna group to a UE located near the antenna or antenna group according to a command of a BS or a BS controller.

Nodes of a multi-BS cooperative system or femto/pico cell cooperative system operate independent BSs and cooperate with each other. Accordingly, each BS of the multi-BS cooperative system or femto/pico cell cooperative system may be a cooperative node of the present invention, Multiple nodes of the multi-BS cooperative system or femto/pico cell cooperative system are connected to each other via a backbone network and perform scheduling and/or handover to perform cooperative transmission/reception. A system in which a plurality of BSs participates in cooperative transmission is referred to as a coordinated multi-point (CoMP) system.

In the RRH, a radio frequency (RF) transceiver and a power amplifier are separated from a BS and are mounted near an antenna such that the antenna operates like the BS. By such a configuration, a distance between the UE and the antenna of the BS can be reduced to increase wireless capacity and minimize resources necessary to increase the number of BSs. The RRH may serve as a relay node for separating a wireless unit of the BS and transmitting and receiving voice and data, independent of the BS.

For example, assume that a plurality of nodes (or points) is present in a macro cell. The plurality of nodes may be referred to as a coordinated RRH, a measurement RRH set, a transmission point set, a reception point set, etc. and the function thereof is equal to the function of the above-described RRH.

Conventionally, a UE transmits an SRS to a BS but does not transmit a power headroom report (PHR) for the SRS. However, as shown in FIG. 8, the UE needs to perform a cooperative operation together with a macro BS and cooperative nodes and to transmit the SRS to several cooperative nodes. In the cooperative operation, the UE needs to transmit the PHR for the SRS when a reception point (reception cooperative node) or a reception point set is dynamically or semi-statically changed. The PHR for the SRS is not transmitted due to introduction of a CA system and the description related to FIG. 8 includes the case in which the number of carriers is one.

Equations 14 and 15 below show PHRs for a PUSCH and a PUCCH for the serving cell c, respectively.

$$PHR_{PUSCH,c} = P_{CMAX,c} - P_{PUSCH,c} \quad \text{Equation 14}$$

$$PHR_{PUCCH,c} = P_{CMAX,c} - P_{PUCCH,c} \quad \text{Equation 15}$$

Equation 16 below shows a PHR for an SRS for the serving cell c proposed by the present invention.

$$PHR_{SRS,c} = P_{CMAX,c} - P_{SRS,c} \quad \text{Equation 16}$$

where, $P_{SRS,c}$ may be expressed by Equation 17 or Equation 18 below.

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \quad \text{Equation 17}$$

In Equation 17, $P_{SRS\_OFFSET,c}(m)$ is a 4-bit parameter which is semi-statically configured by the higher layer for m=0 and m=1 for the serving cell c. For SRS transmission given trigger type 0 then m=0 and for SRS transmission given trigger type 1 then m=1. For $K_S=1.25$, $P_{SRS\_OFFSET,c}(m)$ has 1 dB step size in the range of [−3, 12] dB. For $K_S=0$, $F_{SRS\_OFFSET,c}(m)$ has 1.5 dB step size in the range [−10.5, 12] dB. $M_{SRS,c}$ is the bandwidth of the SRS transmission in a subframe having the index i for the serving cell c expressed in number of resource blocks. $f_c(i)$ is the current PUSCH power control adjustment state for the serving cell c. $P_{O\_PUSCH,c}(j)$ and $\alpha_c(j)$ are parameters as defined in Section 5.1.1.1 of 36.213, where j=1.

$$P_{SRS,c}(i) = \min\{P_{CMAX,c}(i), P_{SRS\_OFFSET,c}(m) + 10\log_{10}(M_{SRS,c}) + P_{O\_SRS,c}(j) + \alpha_{SRS,c}(j) \cdot PL_c + f_{SRS,c}(i)\} \quad \text{Equation 18}$$

In Equation 18 above, $P_{SRS\_OFFSET,c}(m)$ is equal to Equation 17. While $P_{O\_PUSCH,c}(j)$ is reused in Equation 17 above, $P_{O\_SRS,c}(j)$ may be redefined for SRS to be signaled from the BS to the UE in Equation 18. In Equation 18 above, $\alpha_c(j)$ may be configured and used such that the PUSCH and the SRS are differently set like $\alpha_{SRS,c}(j)$. In addition, $PL_c$ may be set to be equal to the PUSCH or may be set to be different from the PUSCH like $PL_{SRS,c}$. $f_c(i)$ may be set to be different from $f_{SRS,c}(i)$. In this case, the BS may signal $\alpha_{SRS,c}(j)$, $f_{SRS,c}(i)$, $PL_{SRS,c}$, $P_{O\_SRS,c}(j)$ to the UE via the higher layer. $f_{SRS,c}(i)$ indicates a current SRS power control adjustment state for the subframe having the index i and may be expressed by a current absolute or accumulated value. If $f_{SRS,c}(i)$ is expressed by the accumulated value, $f_{SRS,c}(i)$ needs to be newly defined.

Since the UE may transmit the SRS in all configured CCs or all configured cells, the UE may transmit the PHR for the SRS using Equations 17 and 18 for all CCs or cells. In addition, even when the UE simultaneously transmits to several cells (or cooperative nodes), the proposed PHR method is applicable. When PHR triggering occurs, the UE configures PHR information according to definition of Equations 16 and 17 or Equations 16 and 18. In the case of the PHR, if the PUSCH transmission point set and the SRS reception point set are equal, transmit power of the SRS may be determined using Equation 17 above and, if the PUSCH transmission point set and the SRS reception point set are different, the transmit power of the SRS may be determined using Equation 18 above.

The UE may configure the PHR for the SRS using Equation 17 or Equations 18 and 16 and transmit $PHR_{SRS}$ to the configured cooperative nodes (or the configured reception point set). If the BS is also included in the reception point set, $PHR_{SRS}$ may also be transmitted to the BS.

When the UE simultaneously transmits the SRS and the PUCCH/PUSCH, scheduling flexibility can be increased from the viewpoint of the BS. In the case of redefinition of Equation 18, that is, if all or at least one of the four parameters $P_{O\_PUSCH,c}(j)$, $\alpha_c(j)$, $PL_c$, $f_c(i)$ are set in an SRS-specific or UE-specific manner unlike the power control equation of the PUSCH, the four parameters may be included in the PHR. In addition, even when the same value as the PUSCH is used, the four parameters may be transmitted to the BS. Alternatively, only parameters which are not the same as the PUSCH may be reported in a state of being included in reporting information. For example, a difference value of PL information, an estimated value or an actually used value is reported. $\alpha_c(j)$ may or may not be applied. The difference value of $f_c(i)$ or the actually used value may be included in the reporting information. If the actually estimated value or the actually used value is reported, a sum of PL and $P_{O\_PUSCH}$ is transmitted.

Now, timing advance (TA) will be briefly described. CA is composed of a combination of component carriers of an intra-band or an inter-band. In the related art, one UL TA is set regardless of a CA configuration. However, it may be difficult to set and use one TA due to a frequency characteristic difference of an inter-band. In addition, when a multiple-TA group is supported, multiple primary cells are possible.

The above-described method for transmitting and configuring the PHR for the SRS may be extended and applied to the case in which multiple timing advances are applied or all the cases in which the PUCCH, the PUSCH and the SRS are simultaneously transmitted.

In the present invention, as an example, in Scenarios 2 and 3 of FIG. 8, a PHR triggering condition for transmitting a PHR at a UE is newly proposed. Although the PHR triggering condition has been described above, the following three PHR triggering conditions are additionally proposed. For basic definition of the PHR, the PHR defined in the related art may be reused or the PHR may be redefined. In the present invention, a method of managing the PHR is proposed separately from definition of the PHR. New PHR triggering condition:

1. When a configuration of an uplink transmission target cell/reception point of a UE is changed
2. When a configuration of a downlink transmission target cell/reception point of a UE is changed
3. When a measurement set (downlink pathloss measurement and/or downlink channel state measurement) is changed In the proposed PHR triggering conditions, triggering may be performed when each of the three conditions is satisfied or when a combination of 1, 2 and 3, that is, a combination of any two conditions or a combination of all three conditions, is satisfied. If these PHR triggering conditions are satisfied, the UE transmits the PHR to the BS.

The newly proposed PHR triggering condition is applicable not only to the PHR for the SRS but also to the PHR for the PUCCH or the PUSCH.

Such triggering conditions are set on a per cell basis. For example, the prohibitPHR-Timer, the periodicPHR-Timer and dl_PathlossChange dB may be managed on a per cell basis in an uplink CoMP scenario.

Next, as another proposal of the present invention, a MAC control element (CE) configuration for a PHR will be described.

MAC CE Configuration Method

1. The UE may configure PHR information for all configured or activated cooperative nodes (e.g., RRHs) present in the macro cell and transmit the PHR information to the BS. At this time, the PHR information for the cooperative nodes may be sequentially configured according to predetermined order of the cooperative nodes or indices of the cooperative nodes and PHR information may be configured. For example, the UE may include the PHR for at least one of the PUCCH, PUSCH and the SRS on a per cooperative node index basis and configure PHR information.
2. The PHR information for the set of uplink transmission target cells/reception points of the UE may be configured and transmitted to the BS. At this time, as described in the MAC CE configuration method 1, the PHR information for the cooperative nodes may be sequentially configured according to predetermined order of the cooperative nodes or indices of the cooperative nodes and PHR information may be configured. For example, the UE may include the PHR for at least one of the PUCCH, PUSCH and the SRS on a per cooperative node index basis and configure PHR information.
3. The PHR information for the set of downlink transmission target cells/reception points of the UE may be configured and transmitted to the BS. At this time, as described in the MAC CE configuration method 1, the PHR information for the cooperative nodes may be sequentially configured according to predetermined order of the cooperative nodes or indices of the cooperative nodes and PHR information may be configured. For example, the UE may include the PHR for at least one of the PUCCH, PUSCH and the SRS on a per cooperative node index basis and configure PHR information.

As the MAC CE configuration method, one MAC CE is configured. If a system is composed of a plurality of DL/UL CCs/cells and multi-point transmission/reception is possible on a per cell basis, the UE configures and transmits one MAC CE on a per cell basis or transmits PHR information of all cells via one MAC CE. In this case, upon configuring the MAC CE, the index of the cell may be added to identify the PHR on a per cell basis. In addition, since the PHR needs to be identified on a per cooperative node basis because a pathloss component value is changed due to a difference in distance between the UE and the cooperative node, information about the cooperative node index may also be included upon configuring the MAC CE for the PHR.

According to various aspects of the present invention, a PHR for an SRS is defined in a system supporting uplink/downlink communication between a plurality of nodes between macro cells or in a macro cell and a PHR is transmitted according to a new PHR triggering method and a MAC CE configuration method for PHR transmission, thereby remarkably improving communication performance.

The aforementioned embodiments are achieved by combination of structural elements and features of the present invention in a predetermined manner. Each of the structural elements or features should be considered selective unless otherwise mentioned. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

A method for transmitting power headroom report and an apparatus for the same is applicable to various mobile communication systems such as a 3GPP LTE or LTE-A system.

The invention claimed is:

1. A method of transmitting a power headroom report (PHR) by a user equipment (UE) in a network in which a base station and one or more cooperative nodes for performing cooperative communication with the base station exist, the method comprising:
   determining a sounding reference signal (SRS) transmit power for transmitting a SRS in a specific serving cell; and
   determining a PHR value for the SRS by subtracting the determined SRS transmit power from a maximum transmit power value configured for the UE for the specific serving cell,
   wherein the determined SRS transmit power is a value for transmission to a plurality of nodes among a first node corresponding to the base station and one or more cooperative nodes.

2. The method according to claim 1, wherein the determined SRS transmit power is determined based on an offset according to a trigger type of the SRS and a transmission bandwidth of the SRS as dedicated SRS in the specific serving cell.

3. The method according to claim 2, wherein the determined SRS transmission power is determined based on at least one of a SRS pathloss compensation factor, a SRS pathloss estimate, a value indicating a SRS power adjustment state and a value expressed by a sum of a cell-specific nominal component and a UE-specific nominal component for the SRS, for the specific serving cell.

4. The method according to claim 1, further comprising:
configuring PHR information including the PHR value for the SRS based on the determined SRS transmit power; and
transmitting the configured PHR information to at least one node of the plurality of nodes,
wherein the plurality of nodes includes a cooperative node configured in the UE or an activated cooperative node or includes a transmission point set or reception point set configured in the UE, and
wherein the PHR information is configured for each of the plurality of nodes.

5. The method according to claim 1, wherein the cooperative node corresponds to an antenna, a remote radio head (RRH), a pico-cell base station, a micro-cell base station, a transmission point, a reception point, a transmission point set or a reception point set.

6. The method according to claim 4, wherein the configured PHR information includes PHR information configured according to predetermined order of cooperative nodes or includes a cooperative node index and PHR information corresponding to the cooperative node index.

7. The method according to claim 4, wherein the configured PHR information is transmitted to all of the plurality of nodes or all of the cooperative nodes.

8. A user equipment (UE) for transmitting a power headroom report (PHR) in a network in which a base station and one or more cooperative nodes for performing cooperative communication with the base station exist, the UE comprising:
a transmitter; and
a processor connected to the transmitter and configured to:
determine a sounding reference signal (SRS) transmit power for transmitting a SRS in a specific serving cell; and
determine a PHR value for the SRS by subtracting the determined SRS transmit power from a maximum transmit power value configured for the UE for the specific serving cell,
wherein the determined SRS transmit power is a value for transmission to a plurality of nodes among a first node corresponding to the base station and a plurality of nodes among one or more cooperative nodes.

9. The UE according to claim 8, wherein the processor is further configured to determine the SRS transmit power based on an offset according to a trigger type of the SRS and a transmission bandwidth of the SRS as dedicated SRS in the specific serving cell.

10. The UE according to claim 9, wherein the processor is further configured to determine the SRS transmission power based on at least one of a SRS pathloss compensation factor, a SRS pathloss estimate, a value indicating a SRS power adjustment state and a value expressed by a sum of a cell-specific nominal component and a UE-specific nominal component for the SRS, for the specific serving cell.

11. The UE according to claim 8, wherein:
the processor is further configured to configure PHR information including the PHR value for SRS based on the determined SRS transmit power,
the transmitter is configured to transmit the configured PHR information to at least one node of the plurality of nodes,
wherein the plurality of nodes includes a cooperative node configured in the UE or an activated cooperative node or includes a transmission point set or reception point set configured in the UE, and
wherein the PHR information is configured for each of the plurality of nodes.

12. The UE according to claim 8, wherein the cooperative node corresponds to an antenna, a remote radio head (RRH), a pico-cell base station, a micro-cell base station, a transmission point, a reception point, a transmission point set or a reception point set.

13. The UE according to claim 11, wherein the configured PHR information includes PHR information configured according to predetermined order of cooperative nodes or includes a cooperative node index and PHR information corresponding to the cooperative node index.

14. The UE according to claim 11, wherein the transmitter is further configured to transmit the configured PHR information to all of the plurality of nodes or all of the cooperative nodes.

* * * * *